US008737786B1

(12) United States Patent
Compton et al.

(10) Patent No.: US 8,737,786 B1
(45) Date of Patent: May 27, 2014

(54) FIBER OPTIC CABLE ASSEMBLY

(71) Applicants: Brandon Duvall Compton, Granite Falls, NC (US); Mark Edward Conner, Granite Falls, NC (US); Michael Todd Faulkner, Granite Falls, NC (US); Joseph Clinton Jensen, Lawndale, NC (US); Lars Kristian Nielsen, Hickory, NC (US)

(72) Inventors: Brandon Duvall Compton, Granite Falls, NC (US); Mark Edward Conner, Granite Falls, NC (US); Michael Todd Faulkner, Granite Falls, NC (US); Joseph Clinton Jensen, Lawndale, NC (US); Lars Kristian Nielsen, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 14 days.

(21) Appl. No.: 13/767,318

(22) Filed: Feb. 14, 2013

(51) Int. Cl.
*G02B 6/44* (2006.01)

(52) U.S. Cl.
USPC .......................................................... 385/100

(58) Field of Classification Search
USPC .......................................................... 385/100
See application file for complete search history.

(56) References Cited

U.S. PATENT DOCUMENTS

| 6,963,690 | B1 | 11/2005 | Kassal et al. | 385/139 |
| 7,277,614 | B2 | 10/2007 | Cody et al. | 385/100 |
| 7,955,004 | B2 | 6/2011 | DiMarco | 385/99 |
| 8,184,939 | B2 | 5/2012 | Parikh et al. | 385/135 |
| 2008/0075548 | A1 | 3/2008 | Cantlon | 408/203.5 |
| 2010/0092135 | A1 | 4/2010 | Barker et al. | 385/76 |
| 2010/0092136 | A1 | 4/2010 | Nhep | 385/76 |
| 2010/0201500 | A1 | 8/2010 | Stirling et al. | 340/407.1 |

FOREIGN PATENT DOCUMENTS

WO 2011143401 A2 11/2010 ............... G02B 6/38

OTHER PUBLICATIONS

Huber+Suhner, Masterline Extreme Hybrid, viewed on this site: http://www.wireless-infrastructure.com/ms-wi/wi-solutions/hs-ms-wi-sol-rem/hs-ms-wi-sol-rem-hyb/hs-ms-wi-sol-rem-hyb-ext.htm.

*Primary Examiner* — Ryan Lepisto
*Assistant Examiner* — Erin Chiem
(74) *Attorney, Agent, or Firm* — Russell S. Magaziner

(57) ABSTRACT

A fiber optic cable assembly includes leg assemblies, a trunk assembly, a splice assembly, and a furcation assembly. Each leg assembly includes a jacket, an optical fiber, strength members, and a connector. The trunk assembly includes a jacket, optical fibers, strength members, and a multi-fiber connector. The splice assembly includes a tube supporting the optical fibers of the leg and trunk assemblies that are spliced together. The furcation assembly is attached to the splice assembly and includes a fan-out structure and first and second locks. The first lock binds the strength members of the leg assemblies to the furcation assembly, and the second lock binds the strength members of the trunk to the furcation assembly. As such, the furcation assembly provides a mechanical linkage between the trunk and leg assemblies to strain relieve the spliced optical fibers in the tube.

20 Claims, 9 Drawing Sheets

FIBER OPTIC CABLE ASSEMBLY

BACKGROUND

Aspects of the present disclosure relate generally to fiber optic cable assemblies. More specifically, aspects of the present disclosure relate to a robust cable assembly that includes a trunk cable joined with a plurality of leg cables.

Cable assemblies may be used to branch optical fibers from a trunk cable to a plurality of leg cables. However, manufacture of cable assemblies may be cumbersome. For example, optical fibers of the trunk cable are typically individually routed through furcation tubes that become the leg cables, which may be particularly time-consuming. Connectors are then attached, often manually, to distal ends of the leg cables. Further, cable assemblies may be less robust than the associated cables. For example, reinforcement components of the cables may simply be glued to the assemblies, where the pull-out strength of the individual leg cables is directly related to the strength of the glue, as opposed to the reinforcement components of the leg cables. A need exists for a robust cable assembly that may be efficiently manufactured.

SUMMARY

One embodiment relates to a fiber optic cable assembly, which includes leg assemblies, a trunk assembly, a splice assembly, and a furcation assembly. Each leg assembly includes a jacket, an optical fiber, strength members, and a connector. The trunk assembly includes a jacket, optical fibers, strength members, and a multi-fiber connector. The splice assembly includes a tube where spliced optical fibers of the leg and trunk assemblies are located. Splicing the optical fibers of the individual leg cables to those of the trunk cable, instead of using continuous optical fibers from the trunk cable to form the leg cables, allows use of pigtails for the leg assemblies and/or trunk assembly that have been separately pre-assembled and/or pre-terminated, such as by an automated process. The furcation assembly is attached to the splice assembly and includes a fan-out structure and first and second locks. The first lock binds the strength members of the leg assemblies to the furcation assembly, and the second lock binds the strength members of the trunk to the furcation assembly. As such, the furcation assembly provides a robust mechanical linkage between the trunk and leg assemblies to strain relieve the spliced optical fibers in the tube and to facilitate rapid deployment and installation of the cable assembly, such as on an communications antenna tower.

Another embodiment relates to a cable assembly, which includes leg assemblies, a trunk assembly, and a furcation assembly. Each leg assembly includes a jacket, an optical fiber radially surrounded by the jacket and extending lengthwise therethrough, strength members reinforcing both the jacket and the optical fiber, and a fiber optic connector supporting the optical fiber. The strength members of the leg assemblies are loose strength members in the form of fibrous strength members that provide tensile strength to the leg assemblies. The trunk assembly includes a jacket, a plurality of optical fibers radially surrounded by the jacket and extending lengthwise therethrough, and strength members reinforcing both the jacket and plurality of optical fibers. The strength members of the trunk assembly are rigid strength members in the form of rod strength members that provide tensile reinforcement as well as anti-buckling support for the trunk assembly. The furcation assembly includes a fan-out structure and first and second locks. The optical fibers of the leg assemblies extend through the fan-out structure and into the jacket of the respective leg assembly. The first lock binds the fibrous strength members of the leg assemblies to the furcation assembly, and the second lock binds the rod strength members of the trunk to the furcation assembly, directly or indirectly by way of intermediate strength members. As such, the furcation assembly provides a mechanical linkage between the trunk and leg assemblies.

Yet another embodiment relates to a cable assembly, which includes a splice assembly and a furcation assembly. The splice assembly includes a tube sized to support a plurality of spliced optical fibers therein. The tube is elongate, having a length of at least five times the average width thereof. The furcation assembly is attached to the splice assembly on an end of the tube. The furcation assembly includes a fan-out structure through which optical fibers of leg assemblies may extend, a first lock configured to bind fibrous strength members, and a second lock configured to bind rigid strength members. As such, the furcation is configured to provide a mechanical linkage between the fibrous and rigid strength members.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments now described in detail, it should be understood that the present inventive and innovative technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figures 1, 1A, 1B:
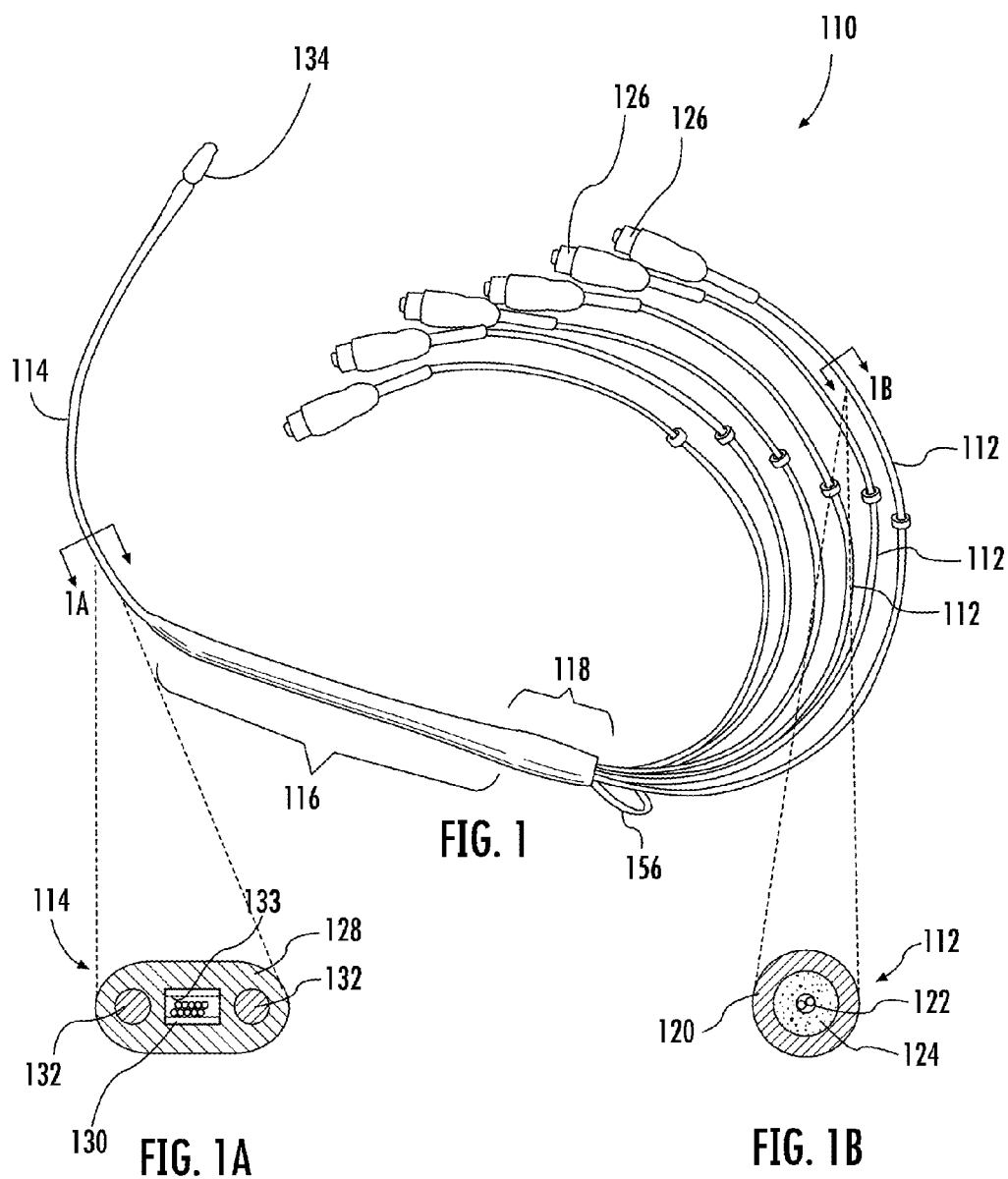
FIG. 1 is a digital image from a top perspective of a cable assembly according to an exemplary embodiment.
FIG. 1A is a sectional view of a trunk cable according to an exemplary embodiment.
FIG. 1B is a sectional view of a leg cable according to an exemplary embodiment.
Figure 2:
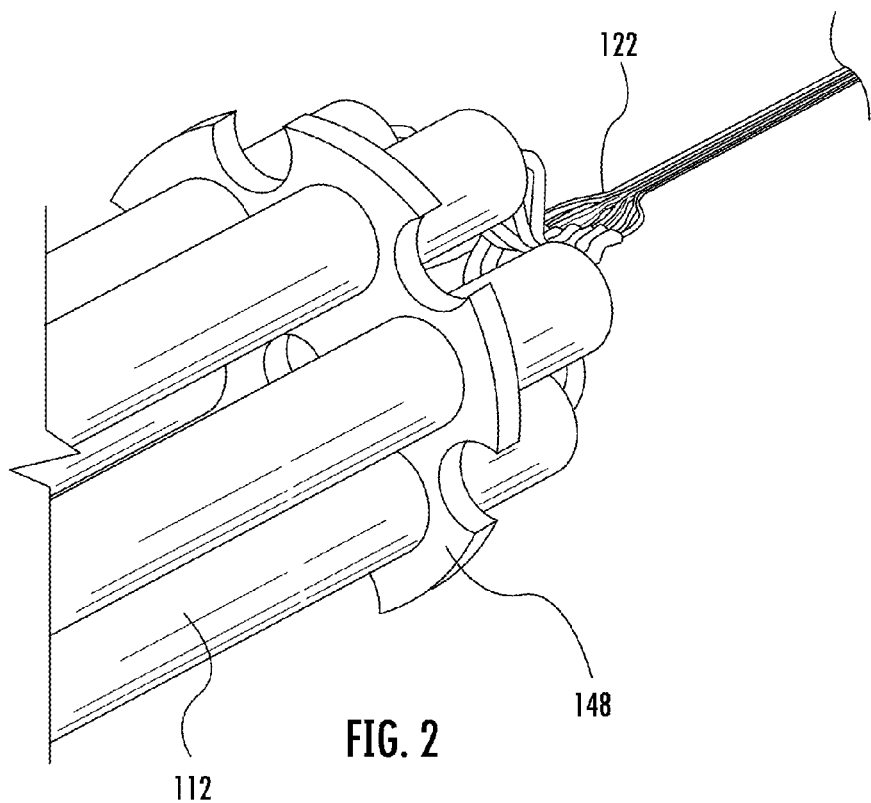
FIG. 2 is a perspective view of leg cables of the cable assembly of FIG. 1.
Figure 3:
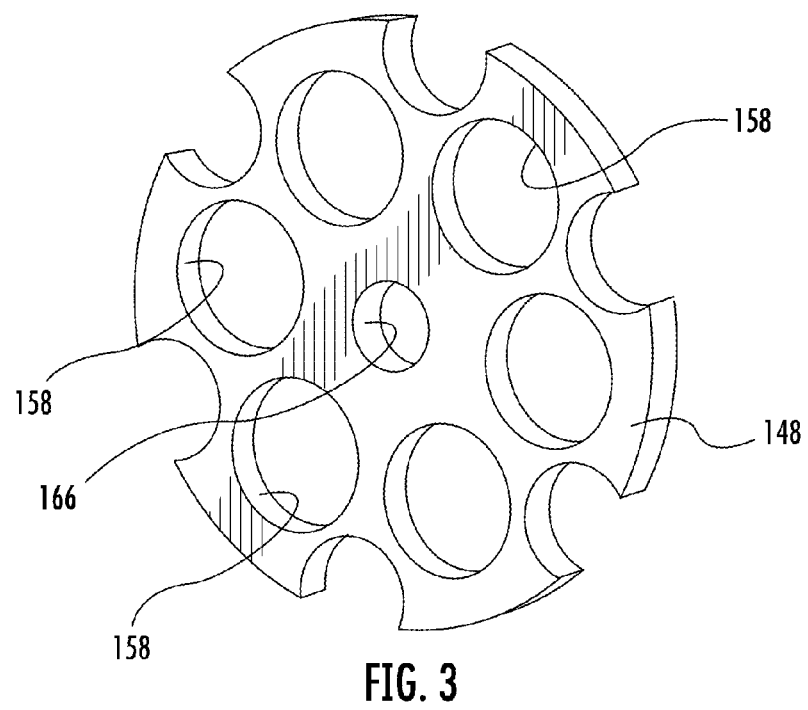
FIG. 3 is a perspective view of an end piece of a furcation assembly according to an exemplary embodiment.
Figure 4:
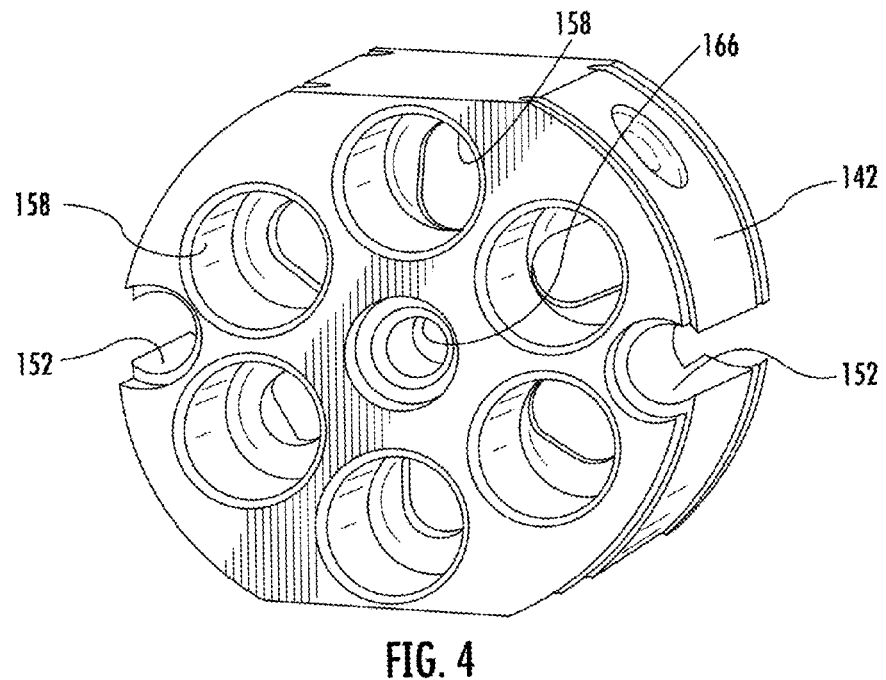
FIG. 4 is a rear perspective view of a fan-out structure of the furcation assembly according to an exemplary embodiment.
Figure 5:
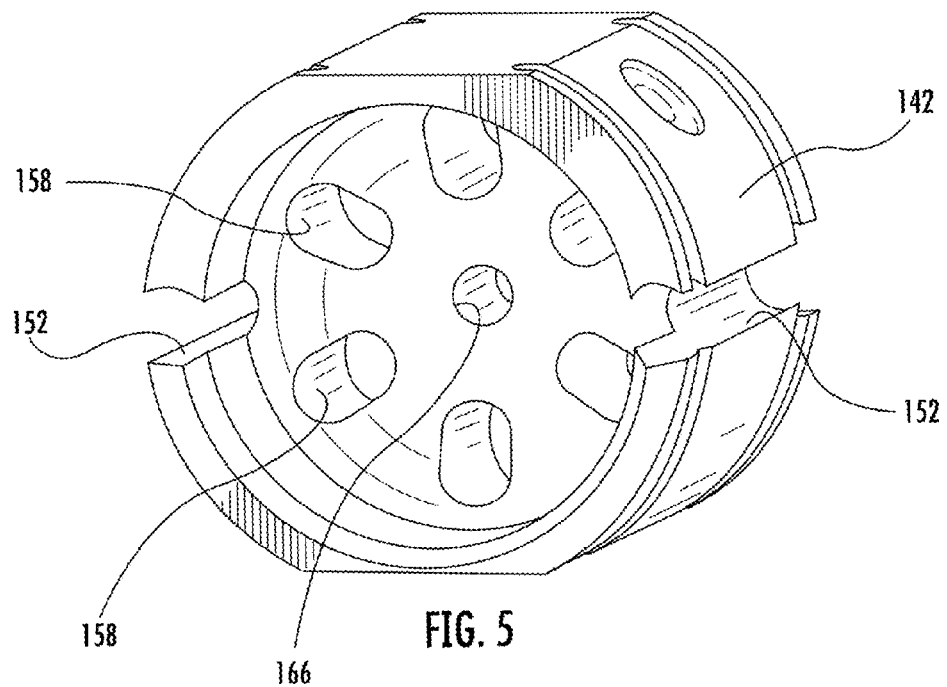
FIG. 5 is a front perspective view of the fan-out structure of FIG. 4.
Figure 6:
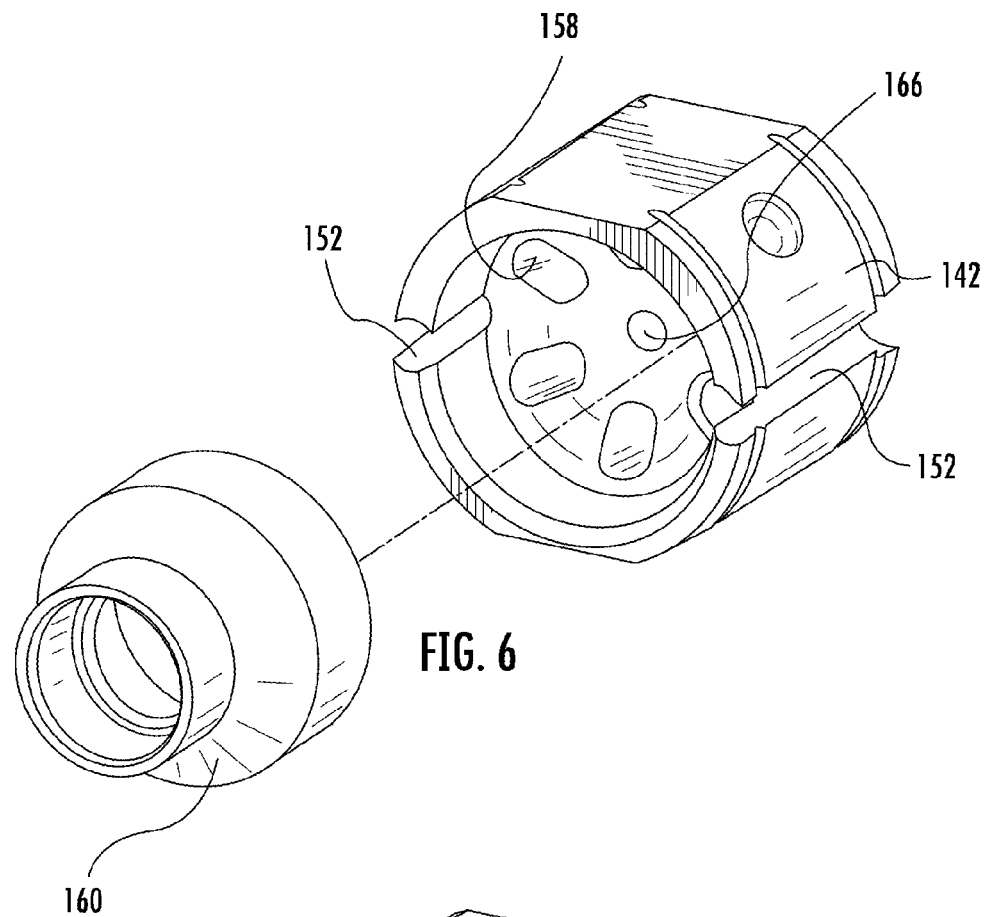
FIG. 6 is an exploded perspective view of the fan-out structure and a funnel according to an exemplary embodiment.
Figure 7:
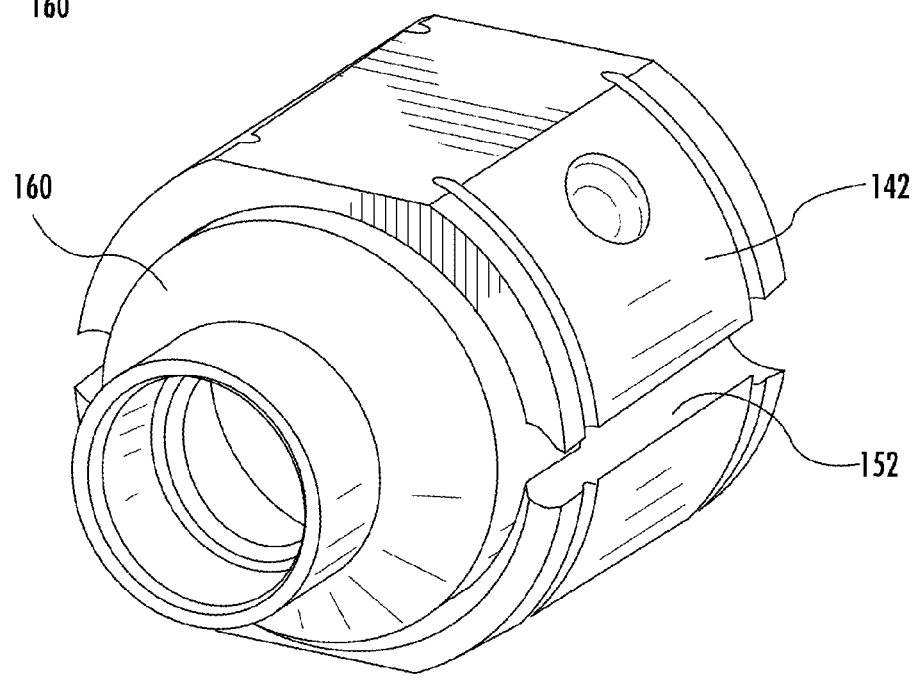
FIG. 7 is a perspective view of the fan-out structure attached to the funnel of FIG. 6.
Figure 8:
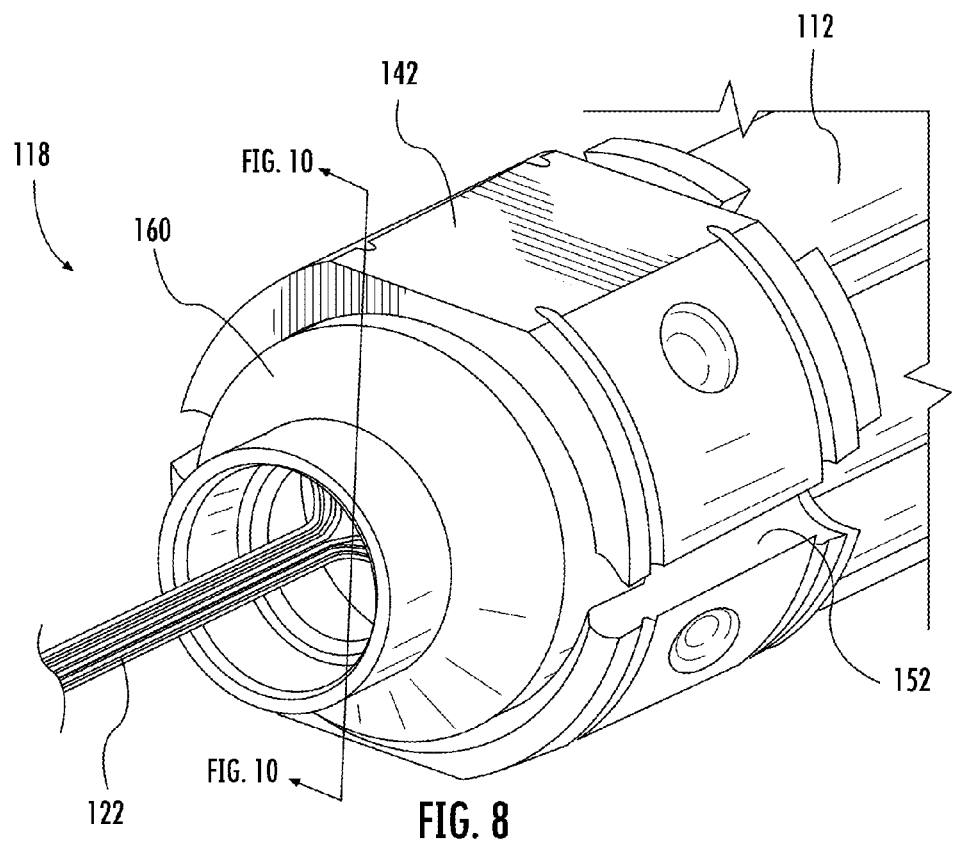
FIG. 8 is a front perspective view of a furcation assembly according to an exemplary embodiment.

Referring to FIG. 1, a fiber optic cable assembly 110 includes leg assemblies 112, a trunk assembly 114, a splice assembly 116, and a furcation assembly 118. According to an exemplary embodiment, as shown in FIG. 1B, each leg assembly 112 includes a jacket 120, an optical fiber 122, strength members 124, and a connector 126. In some embodiments, the jacket 120 of the leg assembly 112 is a polymeric jacket, such as including polyvinyl chloride, medium- or high-density polyethylene, fire-retardant additives, carbon black, and/or other materials. As shown in FIG. 1B, the jacket 120 is round in cross-section and has a diameter of less than 10 mm, such as less than 8 mm, allowing the leg assembly 112 to maneuver in narrower ducts without preferential bending. In other embodiments, the jacket 120 is otherwise shaped. The leg assemblies 112 may include a buffer tube surrounding the optical fiber 122, partitioning the optical fiber 122 from the strength members 124 interior to the jacket 120.

In some embodiments, the optical fiber 122 of the leg assembly 112 is a high-performance optical fiber, such as a bend-insensitive optical fiber. For example, when wrapped one turn around a 10 mm diameter mandrel, the optical fiber 122 exhibits a bend-induced change in optical attenuation of less than 0.5 dB at an 850 nm wavelength, such as less than 0.4 dB, such as less than 0.25 dB. High performing optical fibers, such as CLEARCURVE™ fibers manufactured by Corning Incorporated of Corning, N.Y., allow the leg assembly 112 to be easily routed into and through equipment, ducts, and elsewhere. The optical fiber 122 may be a single-mode optical fiber, a multi-mode optical fiber, a multi-core optical fiber, tight-buffered optical fibers, and/or another type of optical fiber. In some embodiments, each leg assembly 112 may include more than one optical fiber 122, such as two optical fibers each or other numbers of optical fibers.

According to an exemplary embodiment, the connector 126 of the leg assembly 112 supports (i.e., uses, incorporates) the optical fiber 122. For example, the optical fiber 122 may be cleaved, fixed to a ferrule of the connector 126, laser- or machine-polished/shaped, and protected in a rugged, weatherproof connector housing (as shown in FIG. 1). In some embodiments, the connector 126 is an SC-type connector, in other embodiments the connector 126 is an LC-type (duplex) connector, and in still other embodiments the connector 126 is an MPO-type connector. In contemplated embodiments, other types of connectors 126 are used. The connector 126 may be a single-fiber connector or a multi-fiber connector.

Still referring to FIG. 1, the trunk assembly 114 includes a jacket 128, optical fibers 130, strength members 132, and a multi-fiber connector 134. Similar to the jacket 120 of the leg assemblies 112, in some embodiments the jacket 128 of the trunk assembly 114 is a polymeric jacket, such as including polyvinyl chloride, medium- or high-density polyethylene, fire-retardant additives, carbon black, and/or other materials. The jacket 128 of the trunk assembly 114 may have flat exterior sides, as shown in FIG. 1B, or may be round or otherwise shaped.

According to an exemplary embodiment, the jacket 128 of the trunk assembly 114 forms an interior cavity 133 within which the optical fibers 130 are positioned. The cavity 133 may be rectangular to guide movement of the optical fibers 130 as the trunk assembly 114 bends, such as where the optical fibers 130 are loosely positioned in the cavity 133 without a buffer tube. In other embodiments, buffer tubes and/or strength members (e.g., aramid) may be positioned in the cavity 133. The cable of the trunk assembly as shown in FIG. 1A, including the jacket 128, strength members 132, and optical fibers 130, as well as the cable of the leg assemblies as shown in FIG. 1B, including the jacket 120, strength members 124, and optical fiber 122, may be a gel-filled cable, where a petroleum-based gel or other filler surrounds the optical fibers 122, 130 for water-blocking and coupling of the optical fibers 122, 130 to the respective cables; or the cables may be gel-free ("dry"), including a super-absorbent powder, which may be positioned in open spaces of the cables, alone or integrated with yarn, and used to expand when exposed to water, to block flow of the water through the respective cable.

Although shown as having a relatively short length between the splice assembly 116 and the connector 134 in FIG. 1, in contemplated embodiments the trunk assembly 114 may be significantly longer than the leg assemblies 122, such as five or even ten times longer or more. For example, the trunk assemblies 114 may span a large distance, such as portion of an outdoor communications antenna, while the leg assemblies 112 may extend into antenna equipment. According to an exemplary embodiment, the trunk assembly 114 includes an aerial cable between the splice assembly 116 and the connector 134 that is self-supporting along a span of at least 50 meters under National Electrical Safety Code (NESC) light-loading conditions at 1% installation sag, such as at least 60 meters, and/or at least 75 meters at 1% installation sag.

In some embodiments, the optical fibers 130 are part of a fiber optic ribbon, such as a side-by-side arrangement of a plurality of optical fibers bound to one another by a common matrix (e.g., ultra-violet cured acrylate). In some embodiments, the fiber optic ribbon is a twelve-fiber ribbon, a four-fiber ribbon, a six-fiber ribbon, a twelve-fiber ribbon. In some embodiments, the trunk cable includes a stack of ribbons. In other embodiments, the optical fibers 130 of the trunk assembly 114 are loosely arranged therein, and may be located in one or more buffer tubes. The buffer tubes may be gel-filled or gel-free. According to an exemplary embodiment, the number of leg assemblies of the cable assembly is a multiple of the number of optical fibers in the trunk assembly. Like the leg assembly, the individual optical fibers of the trunk assembly may be single-mode, multi-mode, multi-core, tight-buffered optical fibers, bend-insensitive, or other types of optical fibers.

According to an exemplary embodiment, the multi-fiber connector 134 of the trunk assembly 114 supports (i.e., uses, incorporates) some or all of the optical fibers 130 of the trunk assembly 114. For example, the optical fiber 122 may be cleaved together in the multi-fiber connector 134, fixed to a ferrule of the connector 134, laser- or machine-polished/shaped, and protected in a rugged, weatherproof connector housing (as shown in FIG. 1). In some embodiments, the multi-fiber connector 134 is an MPO-type connector, such as an MTP® connector manufactured by US Conec Ltd of Hickory, N.C. In contemplated embodiments, another type of connector is used.

Figure 11:
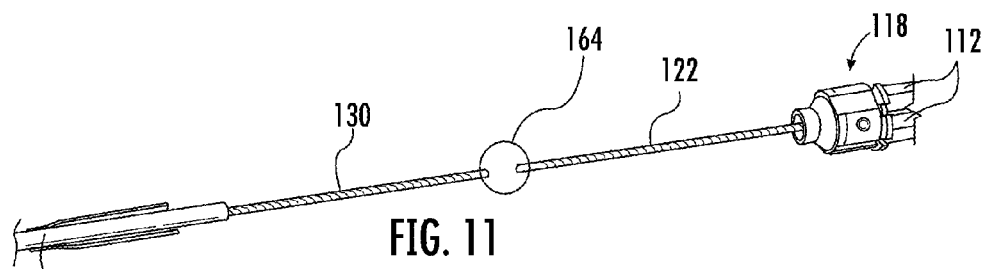
FIG. 11 is a perspective view of optical fibers of trunk and leg cables spliced together according to an exemplary embodiment.
Figure 12:
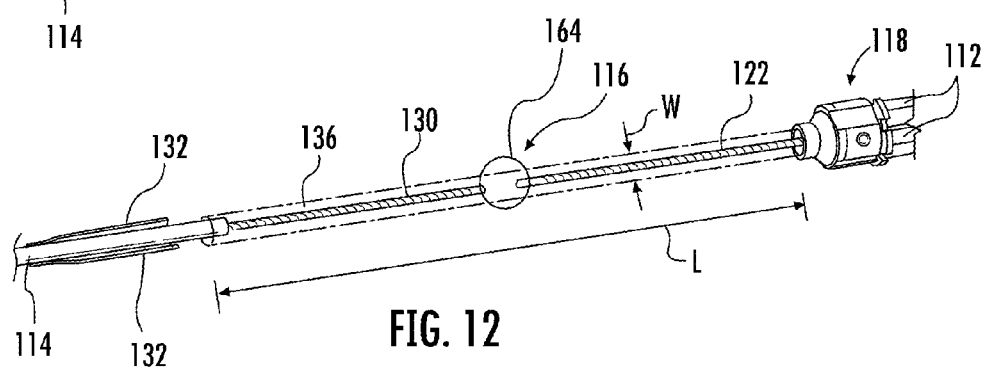
FIG. 12 is a perspective view of the spliced optical fibers of FIG. 11 within a tube of a splice assembly according to an exemplary embodiment.
Figure 13:
FIG. 13 is a perspective view of a rod strength member according to an exemplary embodiment.

Referring to FIGS. 1 and 11-12, according to an exemplary embodiment, the optical fibers 122, 130 of the leg and trunk assemblies 112, 114 are spliced together at splice points 164. The optical fibers 122, 130 are preferably fusion spliced together but may be otherwise spliced. The splice assembly includes 116 a tube 136 (FIG. 12) sized to support a plurality of spliced optical fibers 122, 130 of the leg and trunk assemblies 112, 114. In some embodiments, the tube 136 is elongate, having a length L of at least ten times the average width W thereof. The tube may be cylindrical or otherwise shaped and may be formed from a polymer, such as a clear plastic. In contemplated embodiments, multiple overlapping tubes are used, where the innermost tube supports the spliced optical fibers, and epoxy or another filler may be used to fill space between the innermost tube and one or more tubes exterior thereto (essentially providing a thicker composite tube). Splice protectors, such as UV-cured acrylate encapsulant and/or splints, may be used to reinforce the splice points 164.

Figure 14:
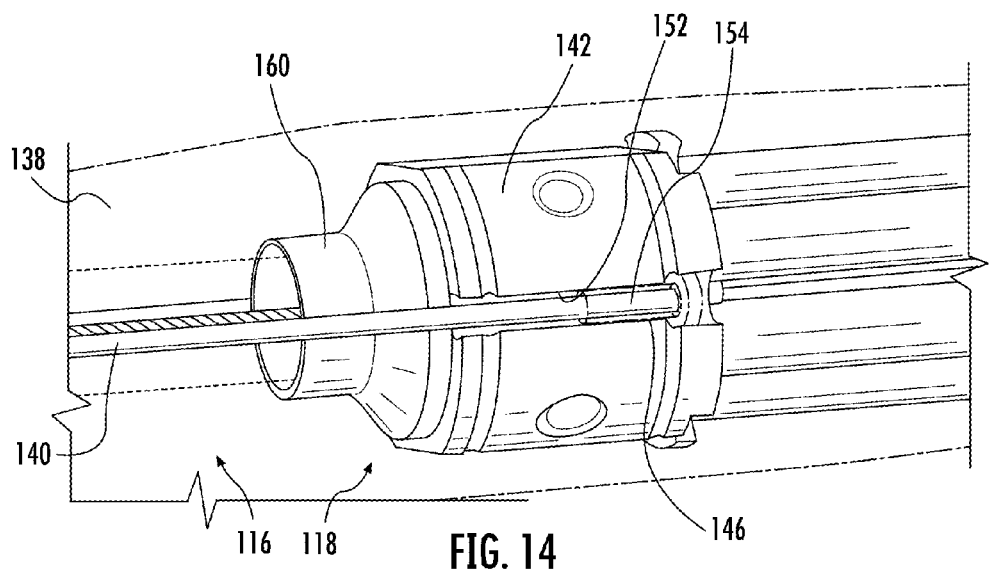
FIG. 14 is a perspective view of the rod strength member of FIG. 13 attached to the furcation assembly of FIG. 8 according to an exemplary embodiment.
Figure 15:
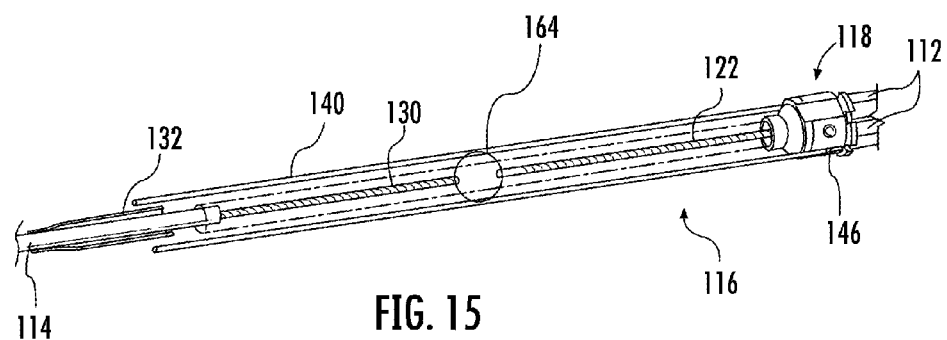
FIG. 15 is wider perspective view of the cable assembly of FIG. 14.

According to an exemplary embodiment, the interior of the tube 136, in some embodiments, is left with open space (e.g., at least 50% of the interior volume is air) and the tube 136 serves to isolate the spliced optical fibers 122, 130 from other parts of the cable assembly 110, such as the encapsulant 138 as shown in FIG. 14 and discussed below, and the strength members 132, 140 as shown in FIG. 15. The open space in the tube 136 allows the spliced optical fibers 122, 130 to move within the tube 136, such as moving to a neutral axis as the cable assembly 110 bends, or to translate within the tube 136 to accommodate strain on either the trunk or leg assemblies 114, 112.

According to an exemplary embodiment, the optical fibers 122, 130 in the tube 136 have excess length relative to the length L of the tube 136 (e.g., at least 0.5% longer, at least 1.5% longer), which allows the tube 136 to stretch without straining the spliced optical fibers 122, 130, such as if the cable assembly 110 is axially loaded in tension. Also, contraction of the cable assembly 110, such as in cold weather, has little to no impact on the spliced optical fibers 122, 130 within the tube 136, which are free to bend and buckle in the open space of the tube 136 of the splice assembly 116. In other contemplated embodiments, the tube 136 is filled with a potting material, such as epoxy, which may further protect the spliced fibers 122, 130 therein by encapsulation and/or improve the weather-ability of the cable assembly 110.

Splicing the optical fibers 122 of the individual leg assemblies 112 to the plurality of optical fibers 130 of the trunk assembly 114, instead of using continuous optical fibers running from the trunk assembly 114 to form the optical fibers of the leg assemblies 112, allows for use of pre-terminated pigtails (i.e., short lengths of cable with connectorized ends) that have been separately pre-assembled, such as by an automated process. In other contemplated embodiments, one or more of the optical fibers 122 of the leg assemblies 112 are direct continuations of optical fibers 130 of the trunk assembly 114, not spliced thereto.

Referring now to FIGS. 1-10, the furcation assembly 118 is attached to the splice assembly 116 (see FIGS. 1 and 12) and includes a fan-out structure 142 and first and second locks 144, 146. The fan-out structure includes openings 158 for receiving individual leg assemblies 112. In some embodiments, the furcation assembly 118 further includes a funnel 160 that connects to or is integrally formed with the fan-out structure 142 to direct the optical fibers 122 of the leg assemblies 112 toward the splice assembly 116 and/or to support attachment of the splice assembly 116 to the furcation assembly 118.

Some or all of the openings 158 of the fan-out structure 142 may be used, depending upon the number of leg assemblies 112 of the particular cable assembly 110. For example, one fan-out structure 142 may support three leg assemblies 112, while another supports six leg assemblies 112. Also, the openings 158 may be tiered or tapered lengthwise therethrough, such as by having a stair-step profile, which allows different jacket 120 sizes to be inserted into the same fan-out structure 142. In some embodiments, different size leg assemblies 112 may be used with the same furcation assembly 118 (e.g., wider and narrower jackets 120; differently shaped jackets 120, 220). For example, a hybrid cable assembly, as discussed below, may include both wider leg assemblies 112 that support conductive members and narrower leg assemblies 112 that support optical fibers 122.

The first lock 144 binds the strength members 124 of the leg assemblies 112 to the furcation assembly 118, and the second lock 146 binds the strength members 132 of the trunk 114 to the furcation assembly 118. As such, the furcation assembly 118 provides a robust mechanical linkage between the trunk and leg assemblies 112, 114 to strain relieve the spliced optical fibers 122, 132 in the tube 136. According to an exemplary embodiment, while fixing the multi-fiber connector 134 of the trunk assembly 114 and pulling one connector 126 of the leg assemblies 112, the cable assembly 110 can support at least 50 lbf of pulling force), such as at least 100 lbf or even at least about 150 lbf of pulling force, without permanently damaging the cable assembly 110, such as (i) without pulling out of the leg assembly 112 from the furcation assembly 118, (ii) without pulling the trunk assembly 114 apart from the splice assembly 116, (iii) without fracturing of the optical fibers 122, 132 of the trunk or leg assemblies 114, 112, and/or (iv) without severing the splice of the spliced optical fibers 122, 132 in the tube 136 of the splice assembly 116.

According to an exemplary embodiment, the strength members 124 of the leg assemblies 112 are loose strength members (e.g., not bound together in a cured matrix) in the form of fibrous strength members that provide tensile strength to the leg assemblies 112. According to an exemplary embodiment, the strength members 124 of the leg assemblies 112 include tensile fibers, such as dielectric aramid and/or fiberglass fibers. The fibrous strength members 124 may be arranged as yarns of such tensile fibers; which may, in some embodiments, be stranded around the optical fibers 122.

According to an exemplary embodiment, the strength members 132 of the trunk assembly 114 are rigid strength members in the form of rod strength members (e.g., beams, rigid wires) that provide anti-buckling support for the trunk assembly 114 as well as tensile reinforcement to the trunk assembly 114. In some embodiments, the strength members 132 of the trunk assembly 114 include metallic rods or dielectric, glass-reinforced plastic rods.

In contemplated embodiments, strength member of the leg assemblies 112 (cf. trunk assembly 114) are rigid strength members, or include rigid strength members. For example, in contemplated embodiments, one or more of the leg assemblies 112 may include a cross-section similar to the cross-section of the trunk assembly 114 shown in FIG. 1A, except with a fewer number of the optical fibers 122 than the trunk assembly 114. In contemplated embodiments, strength member of the trunk assembly 114 are loose strength members, or include loose strength members. For example, in contemplated embodiments, the trunk assembly may include a cross-section similar to the cross-section of the leg assembly 112 shown in FIG. 1B, except with a greater number of optical fibers 130 than the leg assembly 112. In some such embodiments, the trunk assembly 114 may include a central strength member (e.g., rigid strength member, rod strength member), and buffer tubes including groups of optical fibers (e.g., twelve per tube) may be stranded about the central strength member. The trunk cable assembly may include armor, such as wrapped metal tape or extruded dielectric armor (e.g., tough polyvinyl chloride).

Figure 9:
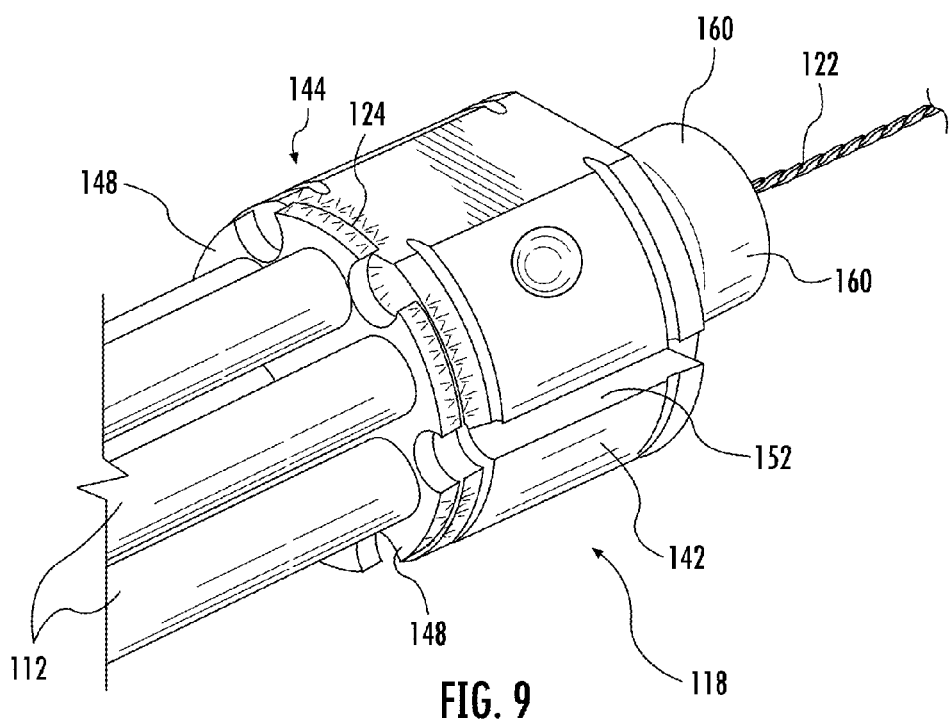
FIG. 9 is a rear perspective view of the furcation assembly of FIG. 8.
Figure 10:
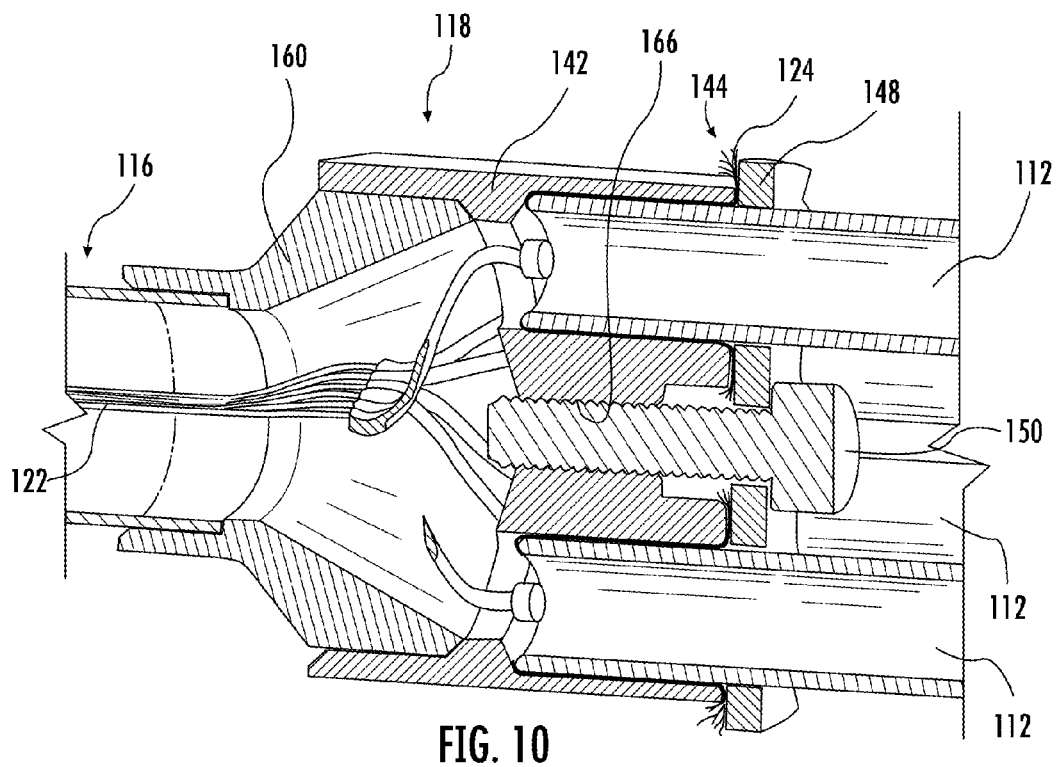
FIG. 10 is a sectional view of the furcation assembly of FIG. 8 taken along line 10-10 of FIG. 8.

Referring to FIGS. 1 and 9-15, the furcation assembly 118 is attached to the splice assembly 116 on an end of the tube 136. Further, as mentioned above, the furcation assembly 118 includes the fan-out structure 142 through which optical fibers 122 of leg assemblies 112 may extend, as shown in FIG. 10. The first lock 144 of the furcation assembly 118, as shown in FIG. 9-10, is configured to bind fibrous strength members of the leg assemblies 112. The second lock 146, as shown in FIGS. 14-15, is configured to bind rigid strength members 140, which may be crimped, such as with metallic crimp sleeves, or otherwise fastened to the rigid strength members 132 of the trunk assembly 114. As such, the furcation assembly 118 is configured to provide a mechanical linkage between the fibrous and rigid strength members 124, 132.

Referring more specifically to the first lock 144 as shown in FIGS. 9-10, in some embodiments the furcation assembly 118 includes an end piece 148, such as a plate, guide, and/or washer. The end piece 148 and the fan-out structure 142 include a passage 166 for receipt of a threaded fastener 150. Accordingly, the fastener 150 (FIG. 10) can be used to compress the end piece 148 toward the fan-out structure 142, such as with fibrous strength members 124 of the leg assemblies 112 clamped therebetween, locking the fibrous strength members 124 of the leg assemblies 112 to the furcation assembly 118.

In other contemplated embodiments, the fibrous strength members 124 are drawn forward through the fan-out structure 142 and clamped on a side of the fan-out structure 142 between the fan-out structure 142 and the tube 136 of the splice assembly 116. In still other contemplated embodiments, the fibrous strength members 124 may be clamped directly to the rigid strength members 140 or 132, and/or wrapped around and/or epoxied thereto. In some embodiments, the leg assemblies 112 are adhered to the furcation assembly 118, such as with epoxy or another adhesive. The threaded fastener 150 may also be used to fasten a loop 156 (FIG. 1) or hook to the cable assembly 110 for hauling the cable assembly 110, such as vertically up an antenna tower.

Referring more specifically to the second lock 146, as shown in FIGS. 14-15, in some embodiments the furcation assembly 118 includes ports 152 for receiving rigid strength members 140. The ports 152 may include grooves extending along an exterior surface of the fan-out structure 142, as shown in FIGS. 4-9. In other embodiments, the ports 152 may include holes in the fan-out structure 142. According to an exemplary embodiment, the strength members 140 lock into the furcation assembly 118 with a cap 154 (FIG. 13) or bump/stop (e.g., crimp sleeve) integrated with the strength members 140 that is too wide to allow the strength members 140 to pull out of or backward through the port 152. In some embodiments the strength members 140 are adhered to the furcation assembly 118.

Figure 16:
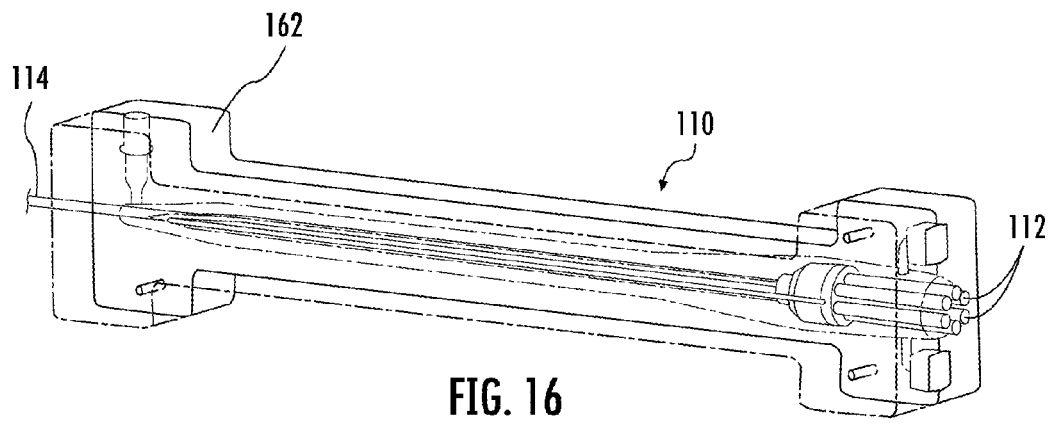
FIG. 16 is a perspective view of an overmold for encapsulating the cable assembly according to an exemplary embodiment.
Figure 17:
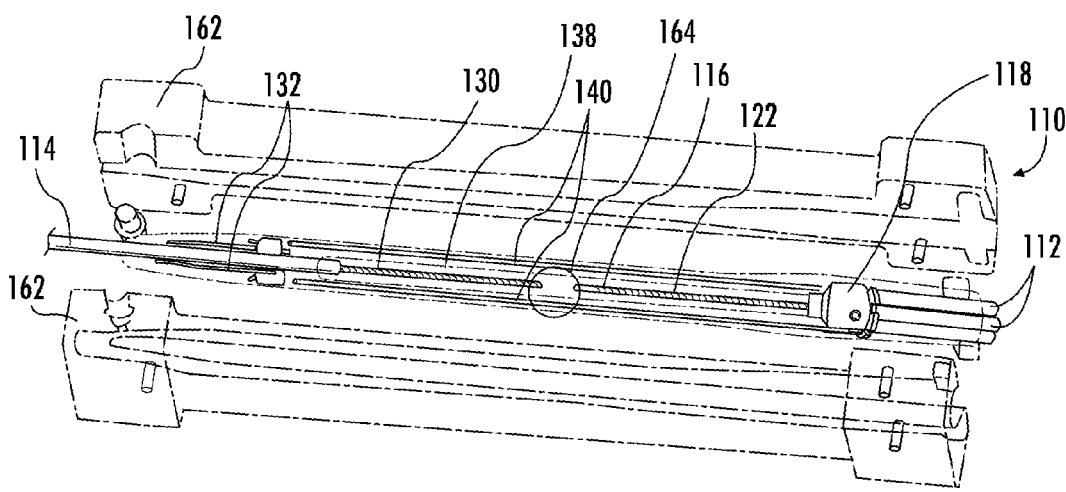
FIG. 17 is an exploded view of the overmold and cable assembly of FIG. 16.
Figure 18:
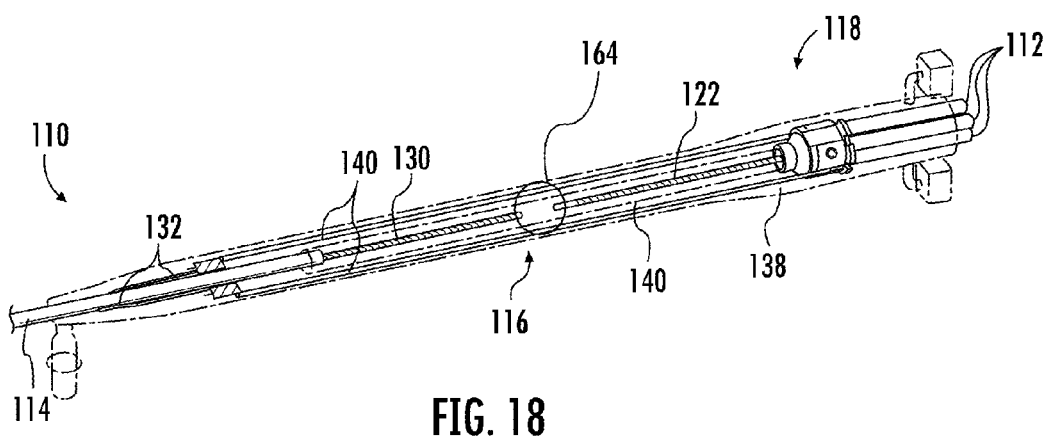
FIG. 18 is a perspective view of the overmolded cable assembly according to an exemplary embodiment.

Referring now to FIGS. 1 and 16-18, according to an exemplary embodiment the cable assembly 110 is overmolded, such as with a polymeric encapsulant 138. The polymeric encapsulant 138 provides a water-impermeable barrier to the cable assembly 110 and/or improves the robustness of the cable assembly 110. In some embodiments, the encapsulant 138 is polyurethane. According to an exemplary embodiment, the encapsulant 138 fully surrounds the splice assembly 116 and the furcation assembly 118. FIG. 16 shows the mold 162, FIG. 17 shows the mold 162 opened, and FIG. 18 shows the encapsulated cable assembly 110. According to an exemplary embodiment, the polymeric encapsulant 138 does not penetrate the tube 136 of the splice assembly 116, and accordingly does not fill the open space therein.

In other contemplated embodiments, one or more heat-shrink tubes or wraps are used in place of or in conjunction with the overmolded encapsulant 138 (e.g., underneath the encapsulant 138; over lengthwise end-portions of the encapsulant 138, extending over adjoining jackets 128, 120). Furthermore, seals, sealants, and gaskets may be used between the leg, furcation, splice, and trunk assemblies 112, 114, 116, 118 to prevent or mitigate leakage of water, encapsulant (e.g., epoxy, polyurethane), or other liquids between or around components of the assemblies 112, 114, 116, 118.

According to an exemplary embodiment, the overmolded portion 138 of the cable assembly 110 has a particularly low-profile, allowing the cable assembly 110 to be maneuvered through narrow ducts and openings in equipment. For example, in some embodiments, the overmolded portion 138 of the cable assembly 110 has a length that is at least ten times the average width thereof and/or at least five times the maximum width thereof, such as at least fifteen times the average width thereof and/or at least ten times the maximum width thereof. In some embodiments, as shown in FIG. 1, the overmolded portion 138 of the cable assembly 110 has a particularly narrow profile such that the overmolded portion 138 of the cable assembly 110 is no wider than the widest of the connectors 126 of the leg assemblies 112 and/or the multi-fiber connector 134 of the trunk assembly 114. In other contemplated embodiments, the overmolded portion 138 of the cable assembly 110 has a profile such that the overmolded portion 138 of the cable assembly 110 is no wider than three-times, two-times, and/or 1.5 times the widest of the connectors 126 of the leg assemblies 112 and/or the multi-fiber connector 134 of the trunk assembly 114

Figure 19:
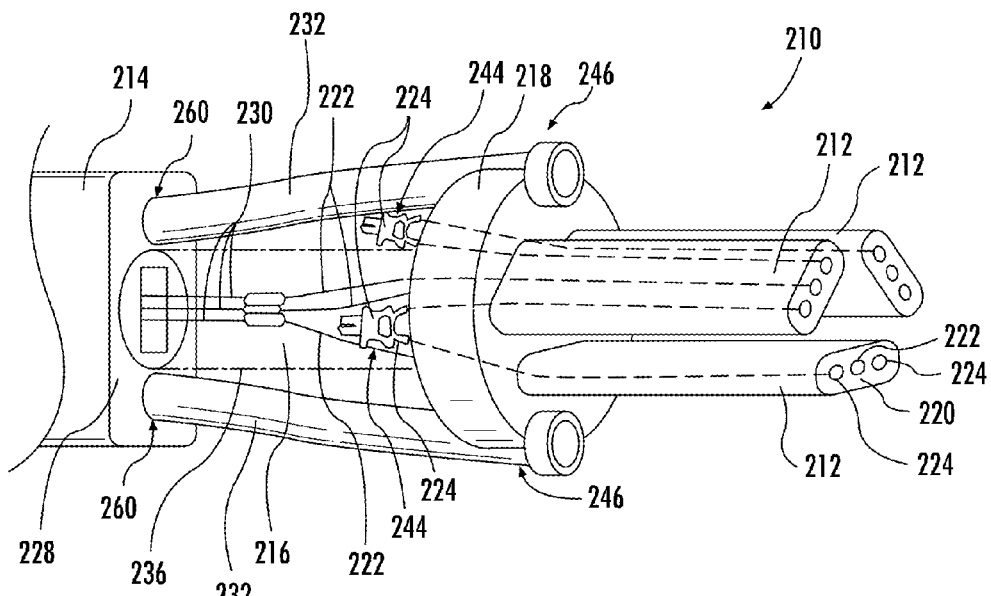
FIG. 19 is a perspective view of a cable assembly according to another exemplary embodiment.

Referring now to FIG. 19, a cable assembly 210, similar to the cable assembly 110, includes leg assemblies 212, a trunk assembly 214, a splice assembly 216, and a furcation assembly 218. Each leg assembly 212 includes a jacket 220, an optical fiber 222, and strength members 224. The trunk assembly 214 includes a jacket 228, optical fibers 230, and strength members 232. In some embodiments, the trunk and/or the leg assemblies 212, 214 may include connectors on distal ends thereof, as shown with the cable assembly 110. The splice assembly 216 includes a tube 236 where the optical fibers 222, 230 of the leg and trunk assemblies 212, 214 are spliced together. The furcation assembly 218 is attached to the splice assembly 216 and includes first and second locks 244, 246.

Different than the cable 110, the leg assemblies 212 of the cable 210 include flat, drop cables, such as SST DROP™ or ROC DROP™ cables manufactured by Corning Cable Systems LLC of Hickory, N.C. As such, the strength members 224 of the leg assemblies 212 are rigid strength members. As shown in FIG. 19, each leg assembly 212 includes at least two rigid strength members 224, and rigid strength members 224 from adjoining leg assemblies 212 in the furcation assembly 218 are mechanically crimped together to form the first lock 244, which binds the strength members 224 of the leg assemblies 212 to the furcation assembly 218.

According to an exemplary embodiment, the trunk assembly 214 may be a flat distribution cable, such as an RPX™ cable manufactured by Corning Cable Systems LLC of Hickory, N.C. According to an exemplary embodiment, the trunk assembly 214 includes access features 260 in the jacket 228 thereof, such as discontinuities of material (e.g., polypropylene) co-extruded into the jacket 228 (e.g., polyethylene) that facilitate tearing open of the jacket 228 to access the strength members 232 and the optical fibers 230 therein. The torn-open jacket 228 may then be cut away and the strength members 232 of the trunk assembly 214 may then locked directly to the furcation assembly 218, without intermediate strength members 140. In other contemplated embodiments, the strength members 232 of the trunk cable 214 extend through the interior of the tube 236 of the splice assembly 216 to fasten to the furcation assembly 218 and/or are fibrous strength members.

Referring generally to FIGS. 1 and 19, in contemplated embodiments the trunk cable assembly 114, 224 may include a hybrid cable (also called composite cable) having both optical fibers 122 and conductive elements (e.g., stranded copper wires). The optical fibers 122, 222 may be spliced, with the spliced connections located in a splice assembly 116, and the conductive elements may be electrically connected to conductive elements in one or more leg assemblies 122 in the splice assembly 116. In some such embodiments, some of the leg assemblies 122 include only optical fibers 122 while others include only electrical conductors. In other such embodiments, some of the leg assemblies 112 include both optical fibers 122 and electrical conductors. Embedded strength members 224 may be used as electrical conductors. For example, the embedded strength members 224 may include co-axial components, such as a steel core surrounded by a more-conductive copper layer.

Figure 20:
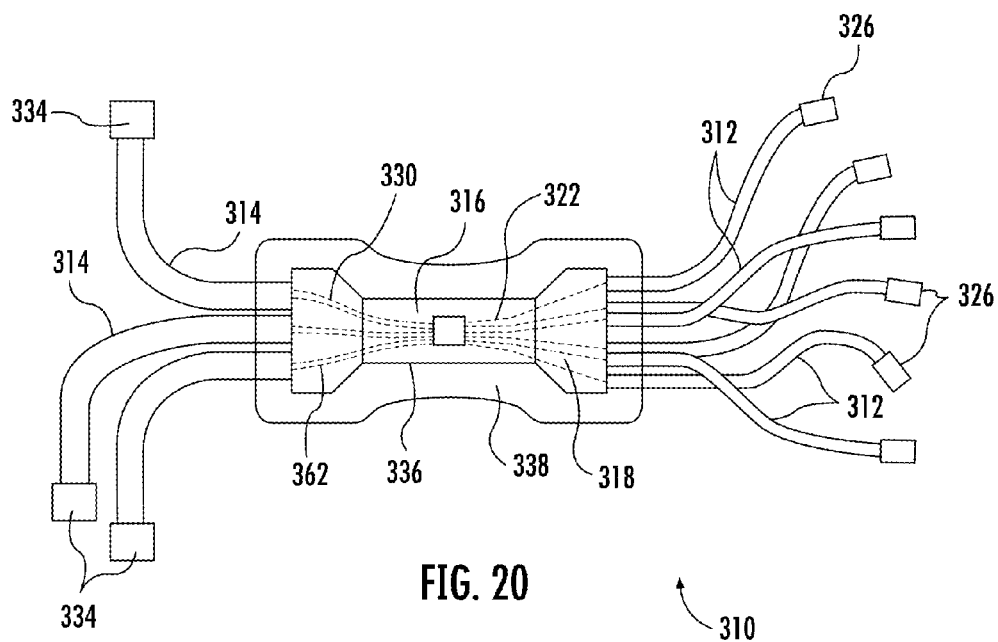
FIG. 20 is a perspective view of a harness assembly according to an exemplary embodiment.

Referring to FIG. 20, technology disclosed herein may also be used with cable assemblies in the form of harness assemblies, such as a harness assembly 310 that include multiple leg assemblies 312, 314 on different sides of a splice assembly 316. For example, a tube 336 of the splice assembly 316 may be adjoined on ends thereof with furcation assemblies 318, 362, similar to the furcation assembly 118. According to an exemplary embodiment, strength members of the leg assemblies 312, 314 on both sides of the harness assembly 310 may be locked to the furcation assemblies 318, 362 by any of the various mechanisms disclosed herein. The number of leg assemblies 312 on one side of the harness assembly 310 may be different than the number of leg assemblies 314 on the other side; however, according to an exemplary embodiment, the total number of optical fibers 322, 330 (spliced together in the splice assembly 316) is the same on either side of the harness assembly 310. Each leg assembly 312, 314 may include a connector 334, 326. The harness assembly 310 may be overmolded with an encapsulant 338.

The construction and arrangements of the cable assembly, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. For example, in at least one contemplated embodiment, the furcation assembly 118 is not included, and the cable assembly 110 includes only one leg assembly 112, such as where the cable assembly 110 may be used to convert one connector type to another. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A cable assembly, comprising:
   leg assemblies, each leg assembly comprising (i) a jacket of the respective leg assembly; (ii) an optical fiber radially surrounded by the jacket of the respective leg assembly, the optical fiber extending lengthwise therethrough; (iii) strength members of the respective leg assembly reinforcing the jacket and the optical fiber thereof; and (iv) a fiber optic connector supporting an end of the optical fiber;
   a trunk assembly, comprising (i) a jacket of the trunk assembly; (ii) a plurality of optical fibers radially surrounded by the jacket of the trunk assembly, the plurality of optical fibers extending lengthwise therethrough; (iii) strength members of the trunk assembly reinforcing the jacket and plurality of optical fibers thereof; and (iv) a multi-fiber connector supporting ends of the plurality of optical fibers;
   a splice assembly, comprising a tube, wherein the optical fibers of the leg assemblies extend into a first end of the tube and the plurality of optical fibers of the trunk assembly extend into a second end of the tube, wherein the plurality of optical fibers of the trunk assembly are spliced with the optical fibers of the leg assemblies and the spliced optical fibers are located within the tube;
   a furcation assembly attached to the splice assembly on the first end of the tube, the furcation assembly comprising (i) a fan-out structure wherein the optical fibers of the leg assemblies extend from the tube, through the fan-out structure, and into the jackets of the respective leg assemblies; (ii) a first lock that binds the strength members of the leg assemblies to the furcation assembly; and (iii) a second lock that binds the strength members of the trunk to the furcation assembly directly or indirectly, by way of intermediate strength members, whereby the furcation assembly provides a mechanical linkage between the trunk and leg assemblies to strain relieve the spliced optical fibers in the tube.

2. The cable assembly of claim 1, wherein the strength members of the leg assemblies are fibrous strength members, while the strength members of the trunk assembly are rigid strength members.

3. The cable assembly of claim 2, wherein the strength members of the leg assemblies comprise at least one of aramid and fiberglass fibers, while the strength members of the trunk assembly comprise metallic or glass-reinforced plastic rods.

4. The cable assembly of claim 2, wherein the strength members of the leg assemblies are positioned interior to the jacket of the respective leg assembly, between the jacket and the optical fiber of the respective leg assembly, and wherein the strength member of the trunk assembly are embedded in the jacket of the trunk assembly.

5. The cable assembly of claim 2, wherein the furcation assembly further comprises an end piece, and wherein the first lock includes the fibrous strength members of the leg assemblies clamped between the end piece and the fan-out structure.

6. The cable assembly of claim 5, wherein the furcation assembly further comprises a threaded fastener, wherein the end piece and furcation assembly define a passage through which the threaded fastener extends, and wherein the threaded fastener compresses the end piece toward the fan-out structure to clamp and bind the fibrous strength members of the leg assemblies.

7. The cable assembly of claim 2, wherein the furcation structure further comprises ports and wherein the second lock includes, fixed to the ports, rigid strength members that are either the rigid strength members of the trunk assembly or extensions fastened thereto.

8. The cable assembly of claim 7, wherein the ports comprise channels formed in the fan-out structure through which the rigid strength members fixed thereto extend.

9. The cable assembly of claim 7, wherein the strength members fixed to the ports extend lengthwise along the exterior of the tube and span the length of the tube from the furcation assembly to the trunk.

10. The cable assembly of claim 1, wherein the splice assembly and the furcation assembly are overmolded with a polymeric encapsulant such that the tube and fan-out structure are fully encapsulated.

11. The cable assembly of claim 10, wherein the overmolded portion of the cable assembly has a particularly narrow profile such that the overmolded portion of the cable is no wider than the widest of the connectors of the leg assemblies and the multi-fiber connector of the trunk assembly.

12. The cable assembly of claim 10, wherein the overmolded portion cable assembly has a particularly narrow profile such that the length of the overmolded portion is at least ten times the average width of the overmolded portion.

13. The cable assembly of claim 12, wherein the length of the overmolded portion is at least fifteen times the average width of the overmolded portion.

14. The cable assembly of claim 1, wherein the interior of the tube includes open space through which the spliced optical fibers may move.

15. The cable assembly of claim 14, wherein the average length of the pairs of spliced optical fibers within the tube is greater by at least 1.5% than the distance between the first and second ends of the tube, thereby mitigating strain of the spliced optical fibers due to flexing of the tube.

16. The cable assembly of claim 1, wherein one or more of the leg assemblies comprises more than one optical fiber, wherein the strength members of the trunk and leg assemblies are dielectric, wherein the connectors of the leg assemblies are mechanically coupled to the strength members of the respective leg assemblies, wherein the jackets of the leg assemblies are coupled directly to the fan-out structure, and wherein the multi-fiber connector of the trunk assembly is mechanically coupled to the strength members of the trunk assembly, the splice assembly further comprising a splice protector within the tube and surrounding the splice of at least one pair of the spliced optical fibers.

17. A cable assembly, comprising:
leg assemblies, each leg assembly comprising (i) a jacket of the respective leg assembly; (ii) an optical fiber radially surrounded by the jacket of the respective leg assembly, the optical fiber extending lengthwise therethrough; (iii) strength members of the respective leg assembly reinforcing the jacket and the optical fiber thereof; wherein the strength members of the leg assemblies are loose strength members in the form of fibrous strength members that provide tensile strength to the leg assemblies; and (iv) a fiber optic connector supporting an end of the optical fiber;
a trunk assembly, comprising (i) a jacket of the trunk assembly; (ii) a plurality of optical fibers radially surrounded by the jacket of the trunk assembly, the plurality of optical fibers extending lengthwise therethrough; and (iii) strength members of the trunk assembly reinforcing the jacket and plurality of optical fibers thereof; wherein the strength members of the trunk assembly are rigid strength members in the form of rod strength members that provide tensile reinforcement as well as anti-buckling support for the trunk assembly; and
a furcation assembly comprising (i) a fan-out structure wherein the optical fibers of the leg assemblies extend through the fan-out structure, and into the jacket of the respective leg assembly; (ii) a first lock that binds the fibrous strength members of the leg assemblies to the furcation assembly; and (iii) a second lock that binds the rod strength members of the trunk to the furcation assembly directly or indirectly, by way of intermediate strength members, whereby the furcation assembly provides a mechanical linkage between the trunk and leg assemblies.

18. The cable assembly of claim 17, wherein the trunk is an aerial cable that is self-supporting along a span of at least 50 meters under National Electrical Safety Code (NESC) light-loading conditions at 1% installation sag.

19. A cable assembly, comprising:
a splice assembly, comprising a tube sized to support a plurality of spliced optical fibers therein, wherein the tube is elongate, having a length of at least five times the average width thereof; and
a furcation assembly attached to the splice assembly on an end of the tube, the furcation assembly comprising:
a fan-out structure through which optical fibers of leg assemblies may extend;
a first lock configured to bind fibrous strength members; and
a second lock configured to bind rigid strength members, whereby the furcation is configured to provide a mechanical linkage between the fibrous and rigid strength members.

20. The cable assembly of claim 19, wherein the furcation assembly further comprises:
an end piece and a threaded fastener, wherein the end piece and the fan-out structure include a passage defined therein through which the threaded fastener extends, and wherein the first lock includes the threaded fastener within the passage tightened to compress the end piece toward the fan-out structure, whereby the fibrous strength members may be clamped and bound between the end piece and the fan-out structure; and ports and rigid strength members fixed to the ports, wherein the ports comprise channels formed in the fan-out structure through which extend the rigid strength members fixed to the ports, wherein the rigid strength members fixed to the ports extend lengthwise along the exterior of the tube of the splice assembly and span the length of the tube, and wherein the second lock includes the rigid strength members, whereby a cable may be bound thereto by the rigid strength members either being strength members of the cable or extensions fastened thereto.

* * * * *